(12) United States Patent
Wang et al.

(10) Patent No.: US 7,170,894 B2
(45) Date of Patent: Jan. 30, 2007

(54) ESTABLISHMENT OF AN END TO END VIRTUAL CONNECTION

(75) Inventors: Celine Yonghong Wang, Irvine, CA (US); Kun Guo, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 875 days.

(21) Appl. No.: 10/027,927

(22) Filed: Dec. 22, 2001

(65) Prior Publication Data

US 2003/0118033 A1    Jun. 26, 2003

(51) Int. Cl.
H04L 12/28    (2006.01)
H04M 7/00    (2006.01)

(52) U.S. Cl. ............... 370/395.2; 370/397; 370/389; 375/222

(58) Field of Classification Search ............ 370/352, 370/354, 389, 395.1, 395.2, 396–397, 400; 375/222
See application file for complete search history.

(56) References Cited

U.S. PATENT DOCUMENTS

| | | | |
|---|---|---|---|
| 6,009,106 A | 12/1999 | Rustad et al. | |
| 6,052,374 A | 4/2000 | Stephens | |
| 6,160,810 A | 12/2000 | Brodigan | |
| 6,198,745 B1 | 3/2001 | Brodigan | |
| 6,292,463 B1 * | 9/2001 | Burns et al. | 370/216 |
| 6,349,089 B1 | 2/2002 | Parruck et al. | |
| 6,388,990 B1 | 5/2002 | Wetzel | |
| 6,487,168 B1 * | 11/2002 | Hamami | 370/216 |
| 6,542,266 B1 * | 4/2003 | Phillips et al. | 370/395.1 |
| 6,560,225 B1 | 5/2003 | Czajkowski et al. | |
| 6,574,313 B1 | 6/2003 | Chea, Jr. et al. | |
| 6,580,254 B2 | 6/2003 | Schofield | |
| 6,587,883 B1 * | 7/2003 | Rajakarunanayake | 709/227 |
| 6,597,689 B1 * | 7/2003 | Chiu et al. | 370/354 |
| 6,636,505 B1 * | 10/2003 | Wang et al. | 370/352 |
| 6,665,295 B1 * | 12/2003 | Burns et al. | 370/389 |
| 6,714,544 B1 * | 3/2004 | Bosloy et al. | 370/395.1 |
| 6,873,628 B1 * | 3/2005 | Tang | 370/480 |

(Continued)

FOREIGN PATENT DOCUMENTS

WO    WO 01/26313 A1    4/2001

(Continued)

OTHER PUBLICATIONS

"Light Link Direct CPON1315, Customer Premises Optical Node", Pacific Broadband Networks, Feb. 13, 2001, 3 pages.

(Continued)

*Primary Examiner*—Doris H. To
*Assistant Examiner*—Ahmed Elallam
(74) *Attorney, Agent, or Firm*—Fogg and Associates LLC; David N. Fogg

(57) ABSTRACT

A method for establishing an end-to-end virtual circuit is provided. The method includes establishing a permanent virtual circuit between customer premises equipment and a digital subscriber line access multiplexer. The method further includes embedding information for a permanent virtual connection between a switch and a remote node in a packet transmitted over a static connection in a network. Finally, the method includes establishing a permanent virtual circuit between the switch and the remote node based on the embedded information.

10 Claims, 2 Drawing Sheets

U.S. PATENT DOCUMENTS

| | | | |
|---|---|---|---|
| 7,047,304 B2 * | 5/2006 | Senapati et al. | 709/229 |
| 7,065,093 B1 * | 6/2006 | Kumar et al. | 370/401 |
| 2003/0120822 A1 * | 6/2003 | Langrind et al. | 709/251 |

FOREIGN PATENT DOCUMENTS

| WO | WO 01/73987 A2 | 10/2001 |
|---|---|---|
| WO | WO 02/091791 A1 | 11/2002 |

OTHER PUBLICATIONS

"Channelized Voice over DSL (CVoDSL) Residential Voice over DSL Technology for Multi-Service Access Platform (MSAP) Equipment", Technology Whitepaper, May 14, 2001, 15 pages.

* cited by examiner

ESTABLISHMENT OF AN END TO END VIRTUAL CONNECTION

TECHNICAL FIELD

The present invention relates to the field of telecommunications, and in particular, to the establishment of an end to end virtual connection.

BACKGROUND

The demand for electronic communication of data has exploded in recent years. A variety of technologies have been developed to meet this demand. These technologies deliver data at ever increasing speeds. One technology for delivering data is referred to as digital subscriber line (DSL) technology. DSL technology encompasses a variety of technologies including but not limited to asymmetric digital subscriber line (ADSL), symmetric digital subscriber line (SDSL) including G.SHDSL, high bit rate digital subscriber line (HDSL), very high bit rate digital subscriber line (VHDSL), and rate adaptive digital subscriber line (RDSL). In each case, DSL technology delivers high speed digital transmission over existing telephone lines, e.g., twisted copper pairs.

DSL technology typically communicates digital data between customer premises equipment (CPE) and a data network. The customer premises equipment is commonly includes a DSL modem or an integrated access device. The data network typically comprises an Asynchronous Transfer Mode (ATM) network or other appropriate data network. DSL technology uses a device known as a digital subscriber line access multiplexer (DSLAM) to facilitate the connection between the customer premises equipment and the data network.

The DSLAM is located, for example, at a central office of the telephone company. A conventional DSLAM includes a number of different cards or boards in a rack or housing. In one conventional approach, the DSLAM includes at least one line card that provides connection to the data network over one or more high capacity lines, e.g., an OC-3 line, a DS-3 line or other appropriate high capacity line. The DSLAM also includes a number of channel cards, e.g., cards that provide connection to a number of modems over a number of telephone lines or twisted pairs.

A data network typically includes a number of switches that are interconnected to provide a plurality of communication paths through the network. Further, customer premises equipment communicates over the network with an Internet service provider (ISP) that is connected to another switch in the network. To establish this connection, a soft permanent virtual connection (SPVC) is established through the network between the customer premises equipment and the ISP. This connection includes at least three parts. The first part is a permanent virtual connection (PVC) between the customer premises equipment and the DSLAM over a telephone line. The second part is a switched virtual circuit (SVC) between DSLAM and the switch connected to the ISP. Finally, another permanent virtual connection provides the final part of the connection between the switch and the ISP.

The switched virtual circuit between the DSLAM and the switch is established using any of a number of protocols. One protocol includes the private network-network interface (PNNI) protocol. This protocol provides dynamic routing of SVCs through the network and is based on the open shortest path first (OSPF) protocol. PNNI allows routing to change dynamically based on current conditions in the network. However, the PNNI protocol is complicated and expensive and time consuming to implement. An alternative to PNNI is the interim inter-switch signaling protocol (IISP). IISP uses a static routing protocol that requires manual configuration of the routes through the network. However, IISP does not provide a mechanism for communicating the information necessary to establish the PVC at the switch connected to the ISP to provide end-to-end connectivity. Therefore, there is a need for improvements in establishing end-to-end connections between an ISP and customer premises equipment.

SUMMARY

Embodiments of the present invention address problems with establishing virtual connections in a data network between customer premises equipment and an ISP. In one embodiment, an end-to-end connection is accomplished by embedding information for the PVC between a switch and the ISP in setting up the connection at the customer premises equipment.

In particular, in one embodiment, a method for establishing an end-to-end virtual circuit is provided. The method includes establishing a permanent virtual circuit between customer premises equipment and a digital subscriber line access multiplexer. The method further includes embedding information for a permanent virtual connection between a switch and a remote node in a packet transmitted over a static connection in a network. Finally, the method includes establishing a permanent virtual circuit between the switch and the remote node based on the embedded information.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide for establishing end-to-end communication over a data network between customer premises equipment and a remote node. Advantageously, the communication is carried over the data network using a simple, static connection with information on a connection between a switch and the remote node embedded in a data packet to complete the end-to-end connection.

Figure 1:
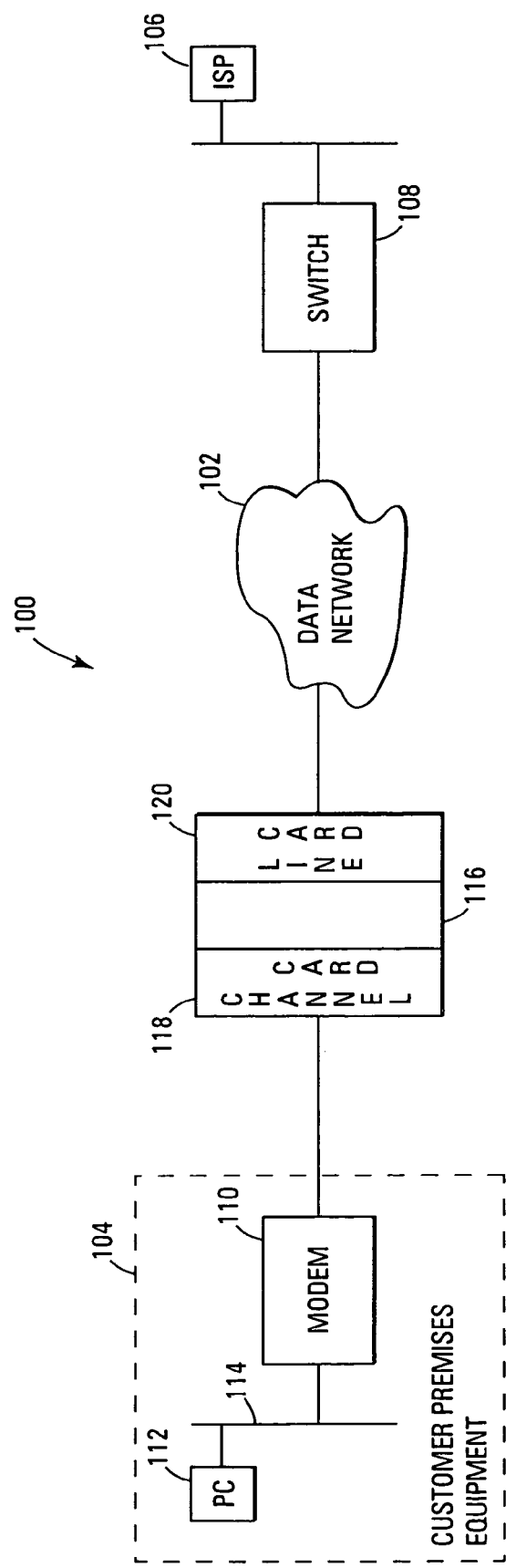
FIG. 1 is a block diagram of an embodiment of a network that provides end-to-end connection over a data network using embedded information to complete the connection to a remote node according to the teachings of the present invention.

FIG. 1 is a block diagram of an embodiment of a network, indicated at 100, that provides end-to-end connection over a data network 102 between customer premises equipment 104 and remote node 106, e.g., an Internet service provider (ISP). Advantageously, the end-to-end communication is established over a static connection through network 102 and is completed based on embedded information in a data packet, e.g., ATM cell, that is carried over the connection in the network. In one embodiment, the embedded information is used to establish a connection between switch 108 at the edge of network 102 to remote node 106.

Customer premises equipment 104 includes modem 110. Modem 110 is adapted to provide communication over a telephone line with access equipment 116. In one embodiment, access equipment 116 comprises a digital subscriber line access multiplexer (DSLAM). Thus, in one embodiment, modem 110 supports a digital subscriber line service, such as, asymmetric digital subscriber line (ADSL), symmetric digital subscriber line (SDSL, G.SHDL), high bit rate digital subscriber line (HDSL), very high bit rate digital subscriber line (VHDSL), and rate adaptive digital subscriber line (RDSL) service.

Customer premises equipment 104 also includes, in one embodiment, at least one computer (PC) 112 that is connected to modem 110 over network 114. Network 114 comprises a wired, wireless or other appropriate connection between computer 112 and modem 110.

Access equipment 116 includes a number of cards that are disposed in a shelf at, for example, a central office. Access equipment 116 includes at least one channel card 118 that provides connection over a telephone line to customer premises equipment, e.g., customer premises equipment 104. Channel card 118 also supports the service implemented on the associated customer premises equipment. Therefore, in one embodiment, channel card 118 supports at least one of asymmetric digital subscriber line (ADSL), symmetric digital subscriber line (SDSL, G.SHDL), high bit rate digital subscriber line (HDSL), very high bit rate digital subscriber line (VHDSL), and rate adaptive digital subscriber line (RDSL) service.

Access equipment 116 also includes at least one line card 120. Line card 120 provides a connection to data network 102 for access equipment 116. Line card 120 supports at least one high capacity communication protocol, e.g., DS-3, OC-3 or the like.

Figure 2:
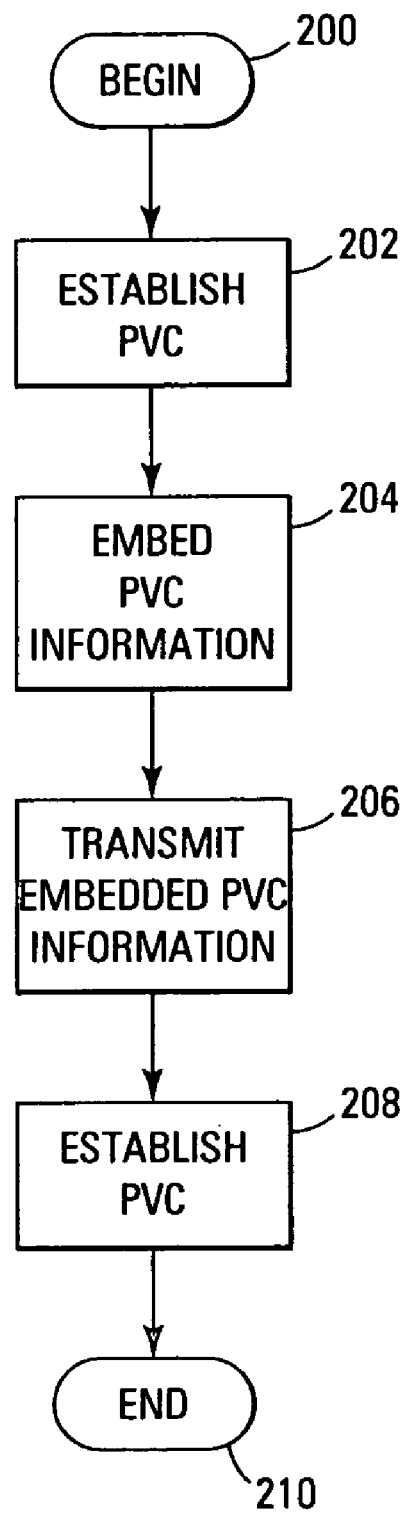
FIG. 2 is a flow chart that illustrates one embodiment of a process for establishing an end-to-end connection between nodes over a data network according to the teachings of the present invention.

In operation, end-to-end connection over network 100 is accomplished in three parts. One embodiment of a process for establishing this connection is depicted in FIG. 2. The method begins at block 200. A permanent virtual connection (PVC) is established at block 202 between customer premises equipment 104 and access equipment 116. At block 204, the process embeds information for a permanent virtual connection between switch 108 and remote node 106 into a packet, e.g., an ATM cell for transmission over network 102. In one embodiment, the information that is embedded in the data packet is embedded in the destination address and includes slot, port, VPI and VCI information for the permanent virtual connection. At block 206, the process transmits the packet with embedded information over a switched virtual circuit through network 102. In one embodiment, this packet is sent over a static connection under the IISP protocol. At block 208, the process sets up the permanent virtual circuit between switch 108 and remote node 106 based on the embedded information. The method ends at block 210.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A digital subscriber line access multiplexer, comprising:
   at least one channel card coupled to at least one customer premises equipment over a communication line;
   at least one line card, coupled to a data network, the line card for providing communication between the at least one customer premises equipment and a remote node coupled to the data network; and
   wherein information for a permanent virtual connection between the remote node and a switch of the data network is embedded in a packet transmitted over a static connection in the data network between the at least one line card and the switch.

2. The digital subscriber line access multiplexer of claim 1, wherein the at least one channel card comprises a channel card that supports one of asymmetric digital subscriber line (ADSL), symmetric digital subscriber line (SDSL, G.SHDL), high bit rate digital subscriber line (HDSL), very high bit rate digital subscriber line (VHDSL), and rate adaptive digital subscriber line (RDSL) service.

3. The digital subscriber line access multiplexer of claim 1, wherein the information comprises information embedded in a destination address of the packet.

4. The method of claim 3, wherein the information comprises port, virtual path identifier (VPI) and virtual channel identifier (VCI) for the permanent virtual circuit between the switch and the remote node embedded in the destination address of the packet transmitted over the static connection.

5. The method of claim 3, wherein the information comprises slot, port, virtual path identifier (VPI) and virtual channel identifier (VCI) for the permanent virtual circuit connection between the switch and the remote node embedded in the destination address of the packet transmitted over the static connection.

6. A method for establishing an end-to-end virtual circuit, the method comprising:
   establishing a permanent virtual circuit between a digital subscriber line modem and a digital subscriber line access multiplexer;
   embedding at least slot, port, VPI and VCI information for a permanent virtual connection between a switch and a remote node in a packet;
   transmitting the packet over a static connection in a data network between the digital subscriber line access multiplexer and the switch; and
   establishing a permanent virtual circuit between the switch and the remote node based on the at least slot, port, VPI and VCI information to complete the end-to-end connection.

7. A communications system, comprising:
   a data network;
   a switch of the data network;
   a digital subscriber line access multiplexer, coupled to the data network and the switch of the data network, comprising:
      at least one channel card coupled to at least one customer premises equipment over a communication line;

at least one line card, coupled to a data network, the line card for providing communication between the at least one customer premises equipment and a remote node coupled to the data network; and wherein a permanent virtual connection exists between the remote node and the switch of the data network based on information embedded in a destination address of a packet transmitted over a static connection between the switch of the data network and the digital subscriber line access multiplexer.

8. The system of claim 7, wherein the at least one channel card comprises a channel card that supports one of asymmetric digital subscriber line (ADSL), symmetric digital subscriber line (SDSL, G.SHDL), high bit rate digital subscriber line (HDSL), very high bit rate digital subscriber line (VHDSL), and rate adaptive digital subscriber line (RDSL) service.

9. The system of claim 7, wherein the switch of the data network and the remote node comprise a permanent virtual circuit.

10. The system of claim 9, wherein the information embedded in the destination address of the packet comprises slot, port, virtual path identifier (VPI) and virtual channel identifier (VCI) information for the permanent virtual connection between the switch and the remote node.

* * * * *